J. E. LEE.
APPARATUS FOR MATURING IMMATURE AND FROST BITTEN COTTON BOLLS.
APPLICATION FILED DEC. 5, 1912.
1,073,914.
Patented Sept. 23, 1913.
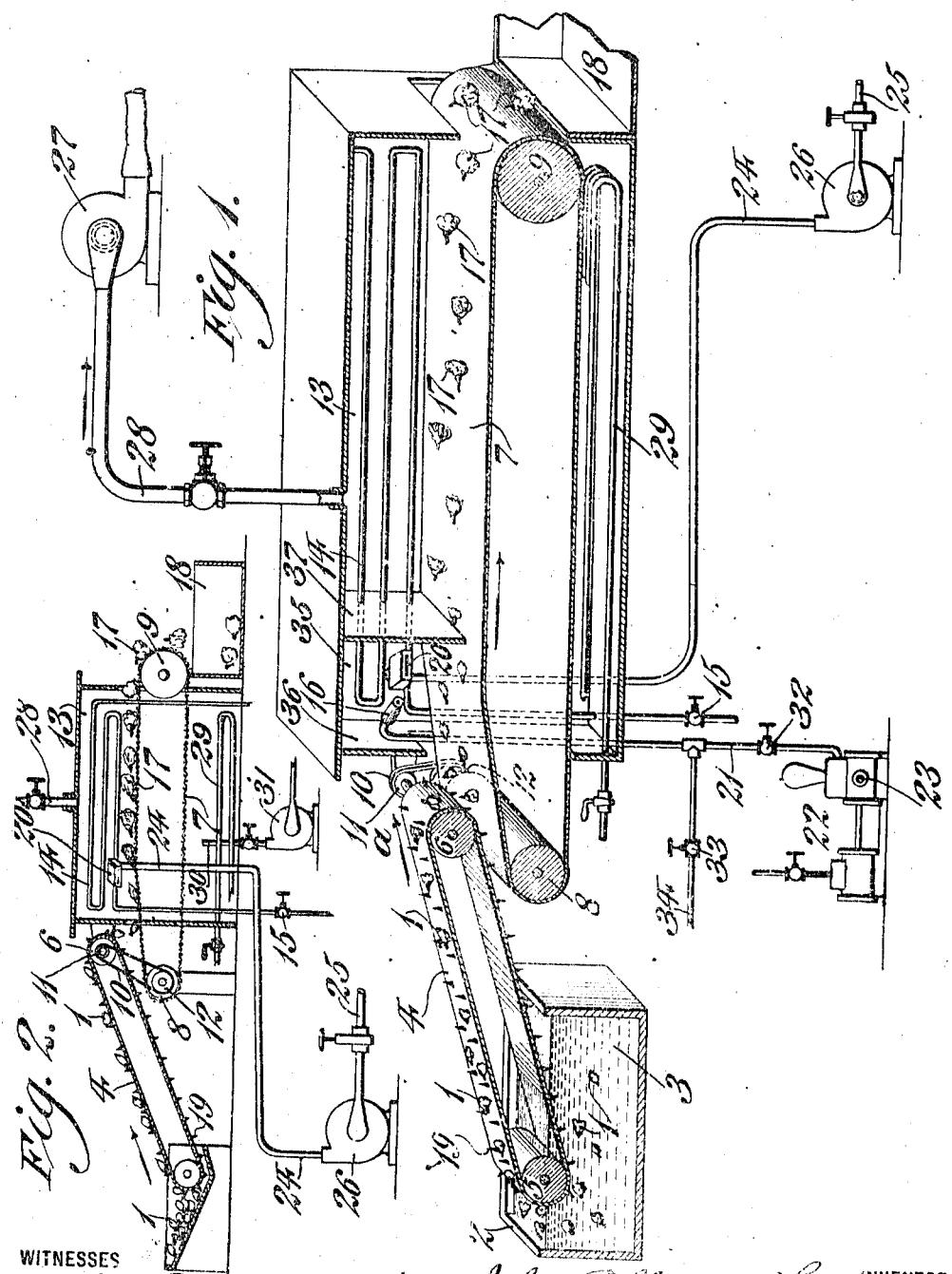
WITNESSES
INVENTOR
John Ellwood Lee.
BY
ATTORNEYS

UNITED STATES PATENT OFFICE.

JOHN ELLWOOD LEE, OF CONSHOHOCKEN, PENNSYLVANIA, ASSIGNOR TO JOHN B. HALL, OF PHILADELPHIA, PENNSYLVANIA.

APPARATUS FOR MATURING IMMATURE AND FROST-BITTEN COTTON-BOLLS.

1,073,914.

Specification of Letters Patent.  Patented Sept. 23, 1913.

Application filed December 5, 1912. Serial No. 735,024.

*To all whom it may concern:*

Be it known that I, JOHN ELLWOOD LEE, a citizen of the United States, residing at Conshohocken, in the county of Montgomery, State of Pennsylvania, have invented a new and useful Apparatus for Maturing Immature and Frost-Bitten Cotton-Bolls, of which the following is a specification.

This invention relates to an apparatus for maturing immature and frost bitten cotton bolls and has for an object to provide a mechanism whereby cotton bolls which have failed to open by reason of an early frost or otherwise may be artificially opened and a product thereby obtained which has heretofore been useless and of no commercial value.

It has for a further object to provide a mechanism for successively treating an immature or frost bitten cotton boll by applying a maturing composition, continuously feeding the bolls at a comparatively slow speed through a moisture extracting mechanism and providing a mechanism for condensing the extracted moisture.

For the purpose of illustrating my invention, I have shown one form of apparatus wherein the steps of my novel invention may be carried out, but it will be understood that the maturing solution or powder may be applied in a different manner, and different mechanism from that shown may be employed, and I do not therefore desire to be limited to any particular mechanism for carrying out the steps of my invention, and furthermore, the proportions of the ingredients employed for the maturing composition or alkaline solution or both, may be varied, according to requirements, under atmospheric or climatic conditions.

Figure 1 is a diagrammatic view partly in section showing one form of an apparatus embodying my invention. Fig. 2 is a similar representation showing a modified form of the apparatus.

Similar numerals of reference indicate corresponding parts in the figures.

Referring to the drawings, 1 designates the immature, unopened or frost bitten cotton bolls which are placed in a suitable tank or receptacle 2, containing a bath or solution 3 of any maturing alkaline liquid such as caustic soda, potash, lime, or ammonia, taken singly or combined in the proportions of about 10 to 20 per cent. of each to sufficient water or other liquid to hold the same in solution.

4 designates an endless apron or equivalent device which passes around the rollers 5 and 6, the former being preferably partly immersed in the bath 3 so that a portion of the endless apron 4 travels therethrough. The rollers 5 and 6 may be driven from any suitable source of power and actuated by sprocket wheels or similar devices as will readily be apparent. In the present instance, the apron 4 is provided with a plurality of projections 19 adapted to engage and propel the saturated cotton bolls in the direction indicated by the arrow *a*.

It will be noted that the apron 4 is preferably inclined in order to initially drain the bolls before delivery to the moisture extracting mechanism, and in view of the fact that it is also driven at a comparatively slow speed the bolls are partially dried before being discharged from the said apron 4.

Adjacent the delivery end of the apron 4 there is a second endless apron or carrier 7 which travels around the rollers 8 and 9 and receives motion by means of the sprocket chain or belt 10 driven by the sprockets 11 and 12, the said sprockets being respectively mounted on the shafts, which carry the rollers 6 and 8. The apron 7, as will be seen, is positioned in such a manner that it will receive the cotton bolls delivered from the apron 4 and it will be noted that this apron 7 moves at a comparatively slow rate of speed in order that the moisture in the bolls may be extracted therefrom.

13 designates the moisture extracting chamber, the interior of which is heated and maintained at a desired temperature by means of pipes 14 in which steam or other heating medium is controlled by the valve 15. Under certain conditions it is desirable to treat the cotton boll during their passage through the extracting chamber by subjecting them to the spraying action of a dust preferably composed of the same alkaline chemicals as previously described with respect to the bath 3. For this purpose, I employ a nozzle or nozzles 20 suitably positioned to inject the said dust into a compartment formed adjacent to the entrance end of the extractor and the said nozzle or nozzles are so disposed as to spray the dust directly upon the bolls, when located upon the apron 7. By the employment of the compartment 35 it will be apparent that a practically closed chamber is formed into which the desired maturing composition or ingredients may be injected through the nozzles 16 or 20, as will be evident to those skilled in the art.

In the present instance, I have shown a supply pipe 25 for the conveyance of the maturing dust or composition to the pipe 24 through which it is propelled to the nozzle or nozzles 20 by means of the fan blower or equivalent device 26. When it is desirable or necessary, I may subject the cotton bolls to the action of a spray through the nozzle or nozzles 16, the said spray being composed of the same alkaline chemical or chemicals as in the bath 3. The nozzle or nozzles 16 are preferably located in the same compartment with the nozzle or nozzles 20 and are connected by a pipe 21 to the pumping element 22 which draws the alkaline solution from a suitable source of supply by way of the pipe 23. In connection with the foregoing, it will be noted that a valve 32 is interposed at a suitable point in the pipe 21 between the pumping element 22 and the nozzle 16 in order to cut off the supply of chemical, and in the place thereof furnish a supply of live or exhaust steam by way of pipe 34 which is controlled by the valve 33 and receives the steam from any suitable source.

35 designates the compartment formed at the entrance end of the extractor between the outer wall 36 thereof and a partition 37 depending from the extractor casing and terminating a short distance above the endless apron 7.

17 designates the cotton bolls shown as being opened or matured by passing through the portion of the apparatus just described which upon leaving the apron 7 are delivered into a suitable receptacle 18 wherefrom they may be removed for the subsequent steps of ginning or other treatment.

27 designates an exhaust fan having communication with the extracting chamber by means of the pipe 28 whereby gases or moisture may be continuously withdrawn from the chamber the said pipe 28 being controlled by a suitable valve. I have also found it desirable to utilize a condenser comprising the pipe or pipes 29 which are located within the extracting chamber and serve to condense the moisture which has been extracted from the bolls during their passage through the aforesaid mechanism. It will be apparent by opening the valve in the pipe 28, more or less, the amount of moisture condensed can be regulated in accordance with the quantity of heated air withdrawn from the extractor 13.

In the construction shown in Fig. 2, in order to avoid confusion, I have employed the same reference numerals to indicate the parts which are identical with those described for Fig. 1, and it will be noted that with one or two exceptions, the two mechanisms are substantially the same.

In the modified construction of Fig. 2, I have dispensed with the initial bath 3, and feed the immature or unopened bolls directly to the apron 4, from which they are delivered, as heretofore described upon the extractor apron 7.

30 designates a suction pipe located in the condenser chamber and operated by a suction device or fan 31, so that the excess gases are drawn downwardly and out of the bottom of the extractor 13, where they are discharged directly to the atmosphere.

The operation is as follows:—The cotton bolls or the like, after being first immersed in the bath 3, for the requisite time, are slowly propelled or fed therefrom by the apron 4, until they drop upon the drying apron 7, whereupon they are slowly fed through the moisture extracting chamber, the effect of which is to cause the immature or unopened bolls to open by the application of the heat thereto, and I thus produce artificially a condition approximating fruition, which would be produced by nature under perfect climatic or atmospheric conditions.

It will be apparent, that if desired, I may employ a plurality of moisture extracting chambers arranged in proximity to each other instead of a single apparatus which I have shown, as under some climatic or atmospheric conditions, it may be necessary to give the bolls a second or third treatment, in order to make them open properly and expeditiously, and while I have shown one form of apparatus in which my invention may be carried out, I do not desire to be limited thereto in every instance.

It will further be apparent that the operation of the apparatus is entirely automatic and several machines can be regulated or operated by a single attendant, and in consequence a large number of bolls may be treated simultaneously.

It will further be apparent that by my novel invention I am enabled to utilize all the frost bitten, unopened or immature cotton bolls, which under present conditions are allowed to dry upon the stalks or fall to the ground, thereby affording a home or place of lodgment for the boll-weevil and its larva.

As a further advantage of my invention, I am enabled to utilize the cotton and cotton seeds from frost bitten unopened and immature cotton bolls, which have heretofore been a waste product, and I have found in practice and by tests that these seeds are substantially as well adapted for cotton seed oil as the seed of bolls matured in the usual way.

It will now be apparent that I have devised a novel and useful construction of an apparatus for maturing immature and frost bitten cotton bolls, which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

1. An apparatus for maturing immature, unopened or frost bitten cotton bolls, comprising a moisture extracting chamber having a compartment in the forward portion thereof, an endless apron within said chamber adapted to receive said bolls, means for injecting steam upon said bolls within said compartment, and means for regulating the temperature of said moisture extracting chamber.

2. An apparatus for maturing immature, unopened or frost bitten cotton bolls, comprising a moisture extracting chamber, a carrier passing through said chamber, a partition in the forward portion of said moisture extracting chamber whereby a compartment is formed, a nozzle contained within said compartment and adapted to initially discharge steam or a maturing solution upon said bolls, and a second nozzle contained in said compartment adapted to discharge a maturing powder upon said bolls.

3. An apparatus for maturing immature, unopened or frost bitten cotton bolls comprising a moisture extracting chamber, a carrier passing through said chamber, a partition 37 in the forward portion of said moisture extracting chamber whereby the compartment 35 is formed, a nozzle 16 contained within said compartment and adapted to initially discharge steam or a maturing solution upon said bolls, a nozzle 20 contained in said compartment adapted to discharge a maturing powder upon said bolls, and means in said moisture extracting chamber for condensing the moisture so extracted.

4. An apparatus for maturing immature, unopened or frost bitten, cotton bolls, comprising a moisture extracting chamber, a carrier passing through said chamber, a partition 37 in the forward portion of said moisture extracting chamber whereby the compartment 35 is formed, a nozzle 16 contained within said compartment and adapted to initially discharge steam or a maturing solution upon said bolls, a nozzle 20 contained in said compartment adapted to discharge a maturing powder upon said bolls, means in said moisture extracting chamber for condensing the moisture so extracted, and means for controlling the amount of moisture condensed.

5. In an apparatus for maturing immature or frost bitten cotton bolls, a receptacle adapted to contain a liquid maturing composition and the bolls to be treated, an inclined conveyer mechanism having a portion thereof submerged in said maturing solution and its discharge end located above said receptacle, a moisture extracting chamber having a compartment in the forward portion thereof, an endless apron positioned to receive the bolls as delivered from said inclined conveyer and adapted to carry said bolls through said moisture extracting chamber, means within said compartment for injecting steam upon said bolls, and means for regulating the temperature of said moisture extracting chamber.

6. In an apparatus for maturing immature or frost bitten cotton bolls, a receptacle adapted to contain a liquid maturing composition and the bolls to be treated, an inclined conveyer mechanism having a portion thereof adapted to be submerged in said maturing solution and its discharge end located above said receptacle, a moisture extracting chamber having a compartment in the forward portion thereof, an endless apron positioned to receive the bolls as delivered from said inclined conveyer and adapted to carry said bolls through said moisture extracting chamber, means within said compartment for injecting steam upon said bolls, means for regulating the temperature of said moisture extracting chamber, and means in said moisture extracting chamber for condensing the moisture so extracted.

7. In an apparatus for maturing immature or frost bitten cotton bolls, a receptacle adapted to contain a liquid maturing composition and the bolls to be treated, an inclined conveyer mechanism having a portion thereof adapted to be submerged in said maturing solution and its discharge end located above said receptacle, a moisture extracting chamber having a compartment in the forward portion thereof, an endless apron positioned to receive the bolls as delivered from said inclined conveyer and adapted to carry said bolls through said moisture extracting chamber, means within said compartment for injecting steam upon said bolls, means for regulating the temperature of said moisture extracting chamber, means in said moisture extracting chamber for condensing the moisture so extracted, and means for controlling the quantity of moisture condensed.

8. An apparatus for maturing, immature or frost bitten cotton bolls comprising mechanism for applying a powdered maturing composition thereto, mechanism for extracting moisture from said bolls, mechanism for slowly moving the bolls through said moisture extracting mechanism, and means in said moisture extracting mechanism for condensing the moisture so extracted.

9. An apparatus for maturing immature or frost bitten cotton bolls comprising mechanism for transporting the bolls in a quiescent state, mechanism for applying a maturing composition to said bolls while in transit, mechanism for extracting moisture from said bolls while in transit, mechanism for condensing the moisture so extracted, and means for controlling the quantity of moisture condensed.

10. An apparatus for maturing immature or frost bitten cotton bolls comprising a substantially closed chamber, means for moving the bolls therethrough, means in said chamber for applying a powdered maturing composition to said bolls, means in said chamber for extracting moisture from the powdered bolls, and means in the chamber for condensing the moisture so extracted.

11. An apparatus for maturing immature or frost bitten cotton bolls comprising means for moistening the bolls, a substantially closed chamber, means for transporting the bolls from the moistening means to said chamber, means for moving the bolls through said chamber, means in said chamber for extracting moisture from said bolls, means for condensing the moisture so extracted, and means for controlling the amount of moisture condensed.

12. An apparatus for maturing immature or frost bitten cotton bolls, comprising a receptacle for receiving the bolls, a condensing chamber, a conveyer leading from said receptacle to said chamber, means for moving the bolls through said chamber, mechanism within and near the entrance end of said chamber for applying a powdered composition to the bolls, means in the chamber for extracting moisture from the powdered bolls, and means for controlling the degree of moisture extracted.

13. An apparatus for maturing immature or frost bitten cotton bolls, comprising a receptacle adapted to contain a liquid composition, an inclined conveyer leading therefrom, a substantially closed stationary chamber, an endless conveyer therein adapted to receive material from the inclined conveyer, moisture extracting means in the chamber, and moisture condensing means in said chamber.

14. An apparatus for maturing immature or frost bitten cotton bolls, comprising a receptacle adapted to contain a liquid maturing composition and the bolls, conveying mechanism leading therefrom constructed to convey, drain and partially dry the bolls, a moisture extracting chamber, and mechanism for moving the bolls through said chamber.

15. An apparatus for maturing immature or frost bitten cotton bolls, comprising a moisture extracting chamber, a conveyer adapted to travel slowly therethrough and to receive the bolls to be treated, and means for applying a maturing composition to said bolls during their initial introduction within said moisture extracting chamber.

16. An apparatus for maturing immature or frost bitten cotton bolls comprising a moisture extracting chamber, a conveyer adapted to travel slowly therethrough and to receive the bolls to be treated, and means for applying a maturing composition to said bolls during their travel within said moisture extracting chamber.

17. An apparatus for maturing immature or frost bitten cotton bolls comprising a moisture extracting chamber, a conveyer adapted to travel slowly therethrough, and to receive the bolls to be treated, means for applying a maturing composition to said bolls before their introduction to said moisture extracting chamber, and means for applying additional maturing composition to said bolls after their introduction into said moisture extracting chamber.

18. An apparatus for maturing cotton bolls, comprising a moisture extracting chamber, a carrier supporting said bolls and passing through said chamber, means for initially injecting steam into said chamber upon the bolls to be treated, and means for thereafter applying a maturing composition to said bolls within said chamber.

19. An apparatus for treating cotton bolls, comprising a moisture extracting chamber, a carrier supporting said bolls and passing through said chamber, means for initially injecting steam into said chamber upon the bolls to be treated, means for thereafter applying a maturing composition to said bolls within said chamber, and means for regulating the temperature of said chamber.

JOHN ELLWOOD LEE.

Witnesses:
E. HAYWARD FAIRBANKS.
C. D. McVAY.